US010041795B2

(12) United States Patent
Sekitsuka (10) Patent No.: US 10,041,795 B2
(45) Date of Patent: Aug. 7, 2018

(54) ELECTRONIC DEVICE, SENSOR CALIBRATION METHOD AND STORAGE MEDIUM

(71) Applicant: CASIO COMPUTER CO., LTD., Shibuya-ku, Tokyo (JP)

(72) Inventor: Tatsuya Sekitsuka, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 410 days.

(21) Appl. No.: 14/852,465

(22) Filed: Sep. 11, 2015

(65) Prior Publication Data

US 2016/0084652 A1 Mar. 24, 2016

(30) Foreign Application Priority Data

Sep. 22, 2014 (JP) .................................. 2014-192533

(51) Int. Cl.
*G01C 17/38* (2006.01)
*G01C 17/28* (2006.01)
*G06F 11/30* (2006.01)

(52) U.S. Cl.
CPC ............. *G01C 17/38* (2013.01); *G01C 17/28* (2013.01)

(58) Field of Classification Search
CPC ...................................................... G01C 17/38
See application file for complete search history.

(56) References Cited

U.S. PATENT DOCUMENTS 7,177,779 B2* 2/2007 Hikida ................... G01C 17/28
342/140
9,068,832 B2* 6/2015 Heikkinen ............. G01C 17/28

FOREIGN PATENT DOCUMENTS

JP 4391416 B2 12/2009

* cited by examiner

*Primary Examiner* — Phuong Huynh
(74) *Attorney, Agent, or Firm* — Holtz, Holtz & Volek PC (57) ABSTRACT

An electronic device includes a magnetic sensor which detects a magnetic field around the electronic device and outputs magnetic data in accordance with the magnetic field detected by the magnetic sensor, a position acquiring section which acquires position information regarding a geographic position of the electronic device, and a processing unit. The processing unit acquires, from the position acquiring section, specific position information for a specific position of the electronic device when an output vector of the magnetic data is oriented to a magnetic pole direction of the earth, derives a geomagnetic vector at the specific position based on the specific position information, and acquires an offset value based on a comparison between the geomagnetic vector and the output vector.

20 Claims, 8 Drawing Sheets

ELECTRONIC DEVICE, SENSOR CALIBRATION METHOD AND STORAGE MEDIUM

CROSS-REFERENCE TO RELATED APPLICATION

This application is based upon and claims the benefit of priority from the prior Japanese Patent Application No. 2014-192533, filed Sep. 22, 2014, the entire contents of which are incorporated herein by reference.

BACKGROUND OF THE INVENTION

1. Field of the Invention

The present invention relates to an electronic device including a magnetic sensor for detecting geomagnetism, sensor calibration method for the magnetic sensor applicable to the electronic device, and a storage medium.

2. Description of the Related Art

In recent years, in the field of portable (or mountable) electronic devices such as portable telephones, smartphones (high-functionality portable telephones), navigation terminals, and sports watches, various services using position information and map information have been provided.

These electronic devices generally include a magnetic sensor (also called an electronic compass), in which a method of measuring an azimuth based on geomagnetism detected by the magnetic sensor has been adopted.

Also, these electronic devices are mounted with a loudspeaker and various electronic components in addition to the magnetic sensor. Accordingly, magnetism emitted from the loudspeaker, magnetism leaking from a metal package of a magnetized electronic component, and the like may be present near the magnetic sensor. Moreover, a strong magnetic field may be present around the electronic device. In this case, the magnetic sensor mounted on the electronic device may be magnetized by receiving magnetism from an electronic component inside the electronic device and a magnetic field around the electronic device.

When the magnetic sensor is magnetized, detection results of the magnetic sensor include an effect by this magnetization in addition to geomagnetism that is an original detection target. In this case, an azimuth calculated based on the measurement value of the geomagnetism detected by the magnetic sensor is different from the accurate azimuth. Accordingly, calibration processing for correcting the error (=offset) of the azimuth due to the magnetization of the magnetic sensor is required to be performed on the magnetic sensor.

For example, Japanese Patent No. 4391416 discloses, as an offset correction method by calibration processing on a magnetic sensor, a method using the fact that magnetic data acquired by arbitrarily changing the direction of a magnetic sensor for detecting geomagnetism in three axis directions is distributed over a spherical plane, in which the center coordinates of a specific sphere whose spherical plane is positioned near each point of a magnetic data group acquired by the magnetic sensor are estimated by using a statistical scheme and an offset value is calculated based on the center coordinates.

In this offset value calculation method, it is required to arbitrarily change the direction of the magnetic sensor during a period of acquiring magnetic data. However, if the direction of the magnetic sensor is not arbitrarily changed and the direction of the magnetic sensor is changed with its orientation with respect to a specific axis (for example, a coordinate axis in a gravity direction) is kept constant, the acquired magnetic data concentrates in a specific plane.

Therefore, in this case, solutions by statistical schemes are not computable, or a calculation error is significantly large, which possibly results in an erroneous solution (center coordinates and offset value).

Moreover, when calibration processing is to be performed on the magnetic sensor, the user (device user) is required to perform a motion of changing the direction of an electronic device having the magnetic sensor, a specific operation, and the like, as described in Japanese Patent No. 4391416. Such motion and operation are burdensome to the user, and therefore put a load on the user.

SUMMARY OF THE INVENTION

The present invention advantageously provides an electronic device, a sensor calibration method, and a storage medium by which a user's load regarding magnetic sensor calibration processing is reduced.

In accordance with one aspect of the present invention, there is provided an electronic device comprising: a magnetic sensor which detects a magnetic field around the electronic device and outputs magnetic data in accordance with the magnetic field detected by the magnetic sensor; a position acquiring section which acquires position information regarding a geographic position of the electronic device; and a processing unit which acquires an offset value of the magnetic sensor, wherein the processing unit (i) acquires, from the position acquiring section, specific position information for a specific position when the electronic device is at the specific position and an output vector of the magnetic data is oriented to a magnetic pole direction of the earth, (ii) acquires a geomagnetic vector at the specific position based on the specific position information, and (iii) acquires the offset value based on a comparison between the geomagnetic vector and the output vector.

In accordance with another aspect of the present invention, there is provided a sensor calibration method comprising: a step of judging whether an output vector of magnetic data outputted in accordance with a magnetic field around a magnetic sensor detected by the magnetic sensor in an electronic device is oriented to a magnetic pole direction of the earth; a step of acquiring specific position information for a specific position when the electronic device is at the specific position and the output vector is judged to be oriented to the magnetic pole direction; a step of deriving a geomagnetic vector at the specific point based on the specific position information; and a step of acquiring an offset value in the magnetic sensor based on a comparison between the geomagnetic vector and the output vector.

In accordance with another aspect of the present invention, there is provided a non-transitory computer-readable storage medium having a sensor calibration program stored thereon that is executable by a computer to actualize functions comprising: processing for judging whether an output vector of magnetic data outputted in accordance with a magnetic field around a magnetic sensor detected by the magnetic sensor in an electronic device is oriented to a magnetic pole direction of the earth; processing for acquiring specific position information for a specific position when the electronic device is at the specific position and the output vector is judged to be oriented to the magnetic pole direction; processing for deriving a geomagnetic vector at the specific point based on the specific position information; and processing for acquiring an offset value in the magnetic sensor based on a comparison between the geomagnetic vector and the output vector.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereafter, embodiments of an electronic device and a sensor calibration method according to the present invention will be described in detail with reference to the accompanying drawings.

<Electronic Device>

Figure 1A:
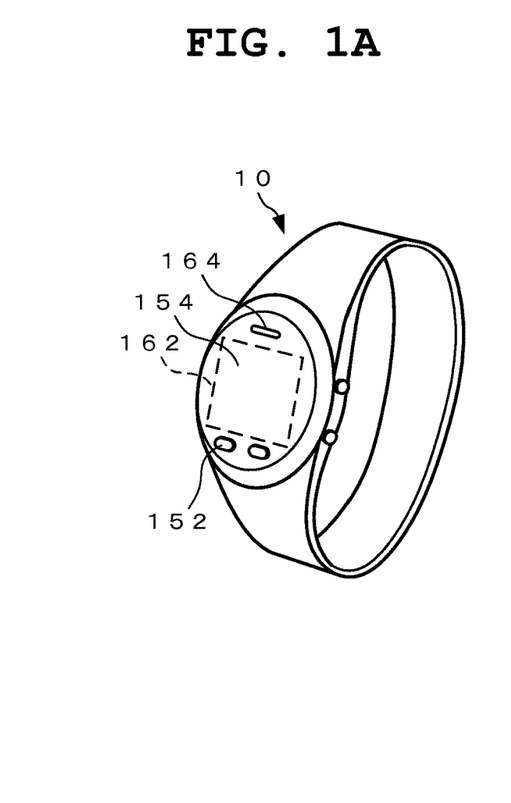
FIG. 1A, FIG. 1B and FIG. 1C are schematic structural diagrams showing a plurality of application examples of an electronic device according to the present invention.
Figure 1B:
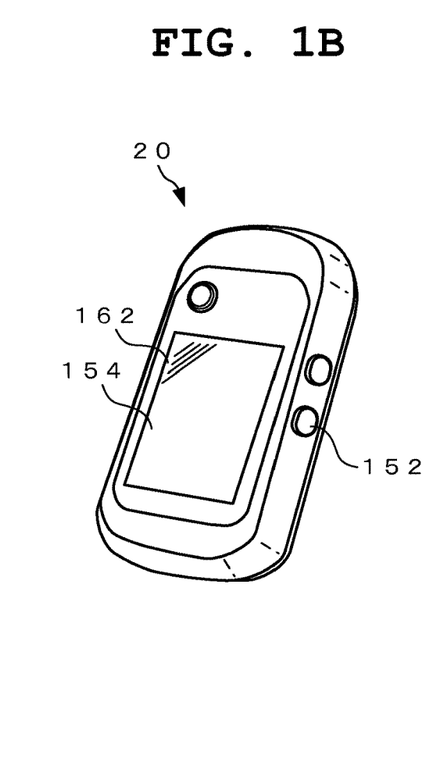
Figure 1C:
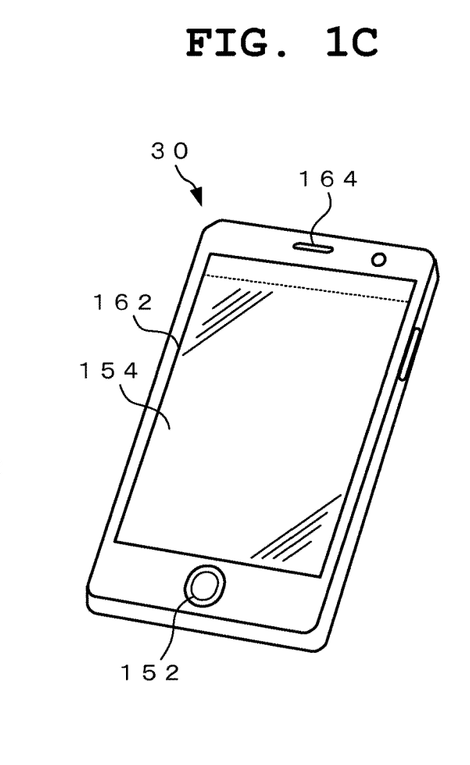

FIG. 1A, FIG. 1B and FIG. 1C are schematic structural diagrams showing a plurality of application examples of the electronic device according to the present invention.

Figure 2:
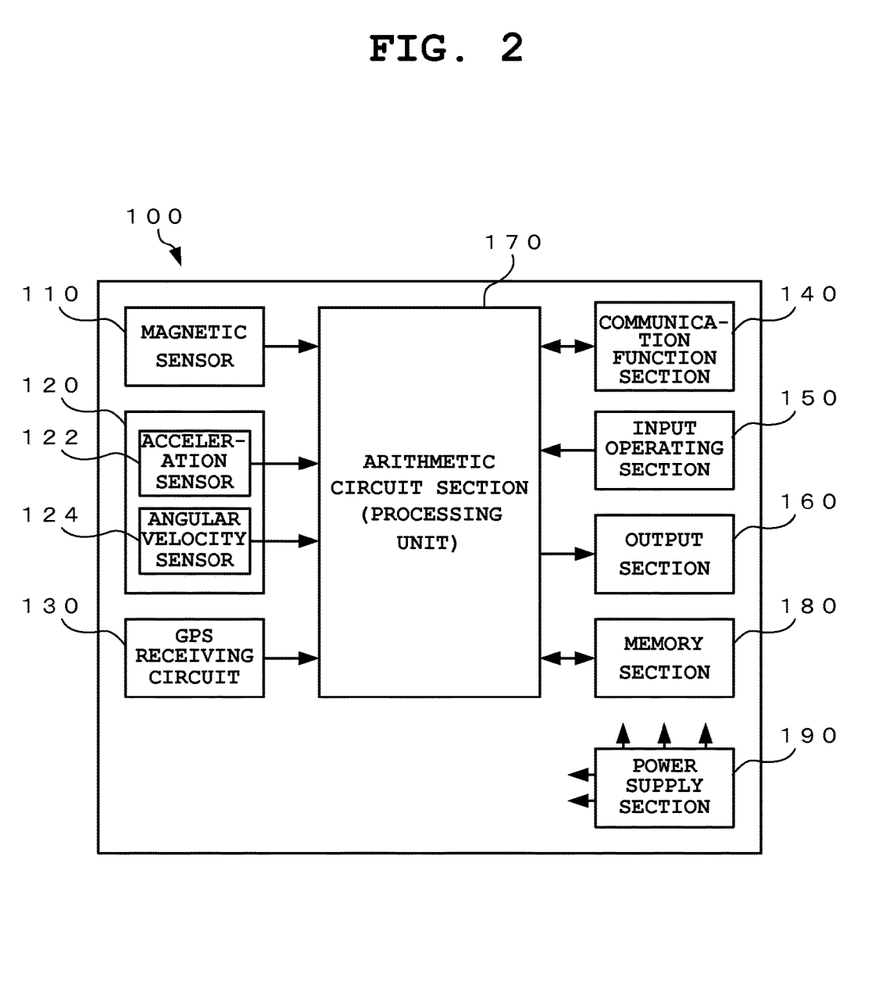
FIG. 2 is a functional block diagram of an embodiment of the electronic device according to the present invention.

FIG. 2 is a functional block diagram of an embodiment of the electronic device according to the present invention.

The electronic device according to the present invention is applied in an electronic device having a function for providing a user with various services using, for example, position information or map information.

Specifically, the electronic device is applied in, for example, a sports watch 10 having an outer appearance of a wristwatch or wristband type as depicted in FIG. 1A, an outdoor device (for example, a GPS logger or navigation terminal) 20 for mountaineering or the like as depicted in FIG. 1B, and a smartphone 30, a tablet device, or the like as depicted in FIG. 1C.

Hereafter, these devices are generically named as "electronic device 100" for convenience of explanation.

The electronic device 100 according to the present embodiment includes, for example, a magnetic sensor 110, a motion sensor 120, a GPS receiving circuit (position acquiring section) 130, a communication function section (position acquiring section) 140, an input operating section 150, an output section 160, an arithmetic circuit section (a processing unit, a coordinate transforming section, a feature point detecting section, an offset calculating section, an offset monitoring section, and an azimuth calculating section) 170, a memory section 180, and a power supply section 190, as depicted in FIG. 2.

The magnetic sensor 110, which is a triaxial magnetic sensor for detecting the direction and strength of magnetism nearby, detects components (strengths) in three axis directions of the magnetic field of the earth that are orthogonal to each other and outputs them as magnetic data.

The magnetic data is used for the arithmetic circuit section 170 described below to calculate an azimuth with reference to the electronic device 100.

Magnetic data acquired as appropriate by the magnetic sensor 110 is associated with time data indicating the time, and stored in a predetermined storage area of the memory section 180 described below.

The motion sensor 120, which includes at least an acceleration sensor 122 and an angular velocity sensor (gyro sensor) 124, detects the body motion and exercise status of the user, force in a specific direction applied to the electronic device 100, and the like.

The acceleration sensor 122 measures a ratio (acceleration) of change in moving speed occurring to the electronic device 100 in accordance with the body motion of the user.

The acceleration sensor 122, which is a triaxial acceleration sensor, detects acceleration components (acceleration signal) along the respective three axis directions that are orthogonal to each other, and outputs them as acceleration data.

The angular velocity sensor 124 measures a change (angular velocity) in a moving direction occurring to the electronic device 100 in accordance with the body motion of the user.

The acceleration sensor 124, which is a triaxial angular velocity sensor, detects angular velocity components of rotational movements around the three axes in the above-described acceleration data (angular velocity signal), and outputs them as angular velocity data.

Sensor data (acceleration data and angular velocity data) acquired as appropriate by the acceleration sensor 122 and the angular velocity sensor 124 is associated with time data indicating the time, and stored in a predetermined storage area of the memory section 180.

The GPS receiving circuit 130 receives electric waves from a plurality of GPS satellites via a GPS antenna (omitted in the drawings) so as to acquire geographic position information based on latitude and longitude information, and outputs the acquired information as positioning data.

Here, positioning data acquired by the GPS receiving circuit 130 when the electronic device 100 is oriented in an arbitrary direction or when a user wearing or carrying the electronic device 100 is moving is used for the arithmetic circuit section 170 to calculate an azimuth to which the electronic device 100 is oriented or a moving direction thereof.

Positioning data acquired as appropriate by the GPS receiving circuit 130 is associated with time data indicating the time, and stored in a predetermined storage area of the memory section 180.

The communication function section 140 transmits or receives various data to and from a communication device (omitted in the drawings) provided outside the electronic device 100 in a predetermined communication format.

In the present embodiment, the communication function section 140 preferably has at least a function for acquiring position information transmitted from an external device when positioning by the GPS receiving circuit 130 cannot be made.

The position information acquired by the communication function section 140 is stored in a predetermined storage area of the memory section 180.

Specifically, various wireless communication methods can be adopted for communication via the communication function section 140, such as wireless LAN (Local Area Network) communication or mobile communication using a portable telephone line network.

In these communication methods, the communication function section 140 acquires, for example, position information (latitude and longitude data) registered in advance by performing communication with an access point, a communication base station, or the like corresponding to the external communication device.

That is, the communication function section 140 has a function for acquiring position information as complementary to or in combination with the function of the GPS receiving circuit 130.

The input operating section 150 has, for example, an operation switch 152, a touch panel 154, and the like provided on the housing of the electronic device 100 (such as the sports watch 10, the outdoor device 20, and the smartphone 30) depicted in FIG. 1A, FIG. 1B, and FIG. 1C.

The input operating section 150 is used for various input operations, such as an ON/OFF operation for the operation power supply of the electronic device 100 or the positioning operation of the GPS receiving circuit 130, an operation of application software, and a setting operation for items to be notified by the output section 160 (such as a display section and acoustic section) described below.

The output section 160 has a display section 162, an acoustic section 164, a vibration section (omitted in the drawings), and the like provided in the housing of the electronic device 100.

The output section 160 displays at least an azimuth based on magnetic data acquired by the magnetic sensor 110, sensor data acquired by the motion sensor 120, and position information and map information based on positioning data acquired by the GPS receiving circuit 130, emits various alarm sounds, or vibrates in various modes so as to visually, aurally, or tactually provide the user with various information for notification.

The arithmetic circuit section 170 is a processing unit such as a CPU (Central Processing Unit) or MPU (Microprocessor) having a clock function, and executes a predetermined control program and algorithm program based on an operation clock.

As a result, the arithmetic circuit section 170 controls various operations such as a sensing operation by the magnetic sensor 110 and the motion sensor 120, a positioning operation by the GPS receiving circuit 130, calibration processing and azimuth calculation processing by the magnetic sensor 110 described below, and a notifying operation by the output section 160.

Note that a method for controlling the electronic device 100 including calibration processing on the magnetic sensor 110 will be described further below.

The memory section 180 stores, in a predetermined storage area, magnetic data acquired by the magnetic sensor 110, sensor data acquired by the motion sensor 120, positioning data acquired by the GPS receiving circuit 130, and the like in association with time data.

Also, the memory section 180 stores, in a predetermined storage area, various data generated by a sensor calibrating operation performed by the arithmetic circuit section 170 and an offset value of the magnetic sensor 110.

Moreover, the memory section 180 stores a control program for the magnetic sensor 110, the motion sensor 120, the GPS receiving circuit 130, and the like to perform an operation in each section and an algorithm program for performing calibration processing on the magnetic sensor 110 based on the above-described magnetic data, sensor data, and positioning data. Note that these programs may be incorporated in advance in the arithmetic circuit section 170.

Note that the memory section 180 may be partially or entirely in a form of a removable storage medium such as a memory card, and may be structured to be removable from the electronic device 100.

The power supply section 190 supplies driving power to each section inside the electronic device 100.

In cases where the electronic device 100 is a portable device, for example, a primary battery such as a commercially-available coin-shaped battery or button-shaped battery or a secondary battery such as a lithium-ion battery is adopted as the power supply section 190.

Also, in addition to these primary battery and secondary battery, the power supply section 190 may have a power supply by energy harvest technology for generating electricity by energy such as vibrations, light, heat, electromagnetic waves, and may supply power generated thereby as driving power singly or in combination with power by the above-described primary battery or secondary battery.

<Electronic Device Control Method>

Next, a control method (sensor calibration method) for the electronic device according to the present embodiment is described with reference to the drawings.

Note that an electronic device control method depicted in the following flowchart is achieved by the above-described arithmetic circuit section 170 performing processing in accordance with a predetermined control program and algorithm program.

Figure 3:
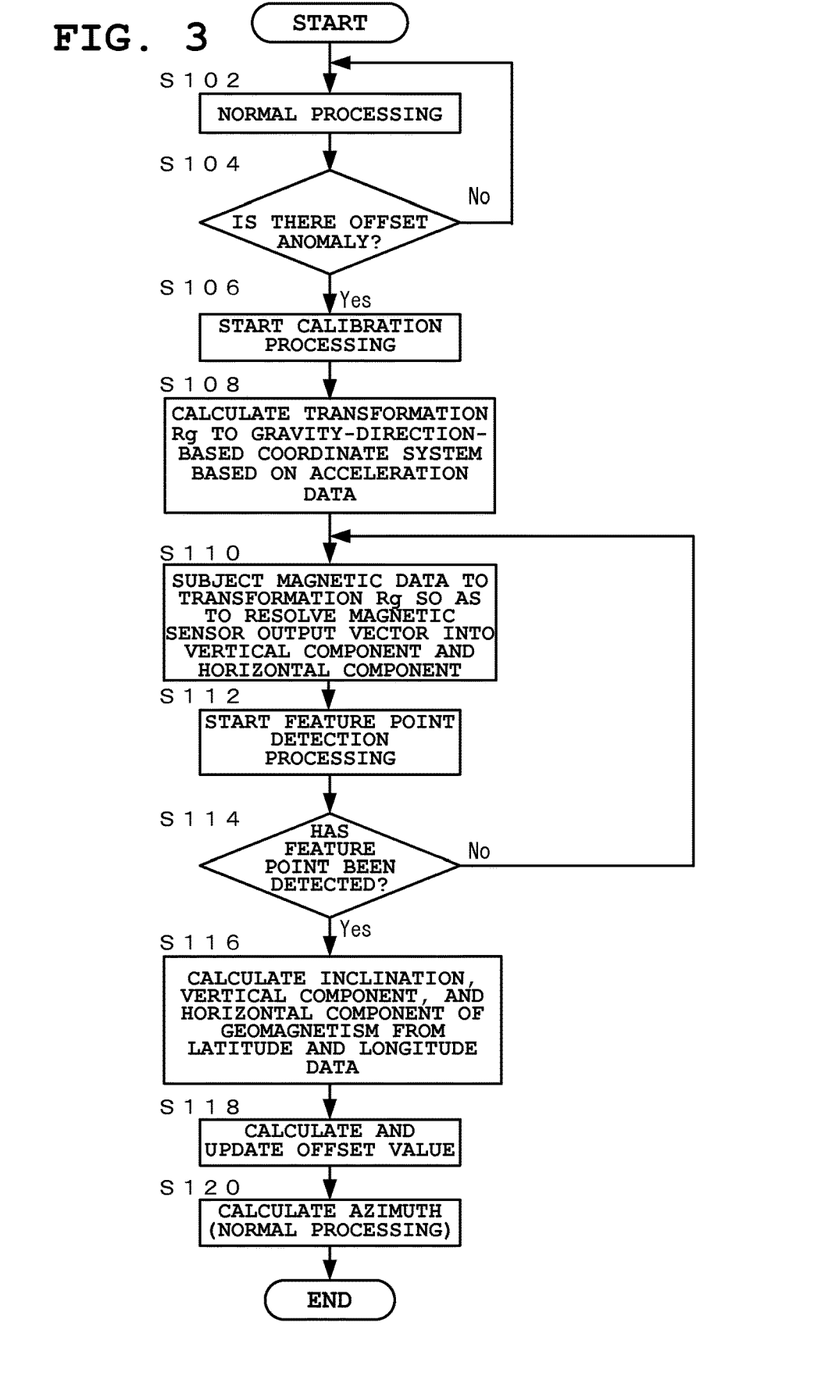
FIG. 3 is a flowchart of an example of a control method for the electronic device according to the embodiment.

FIG. 3 is a flowchart of an example of the control method in the electronic device according to the present embodiment.

Figure 4:
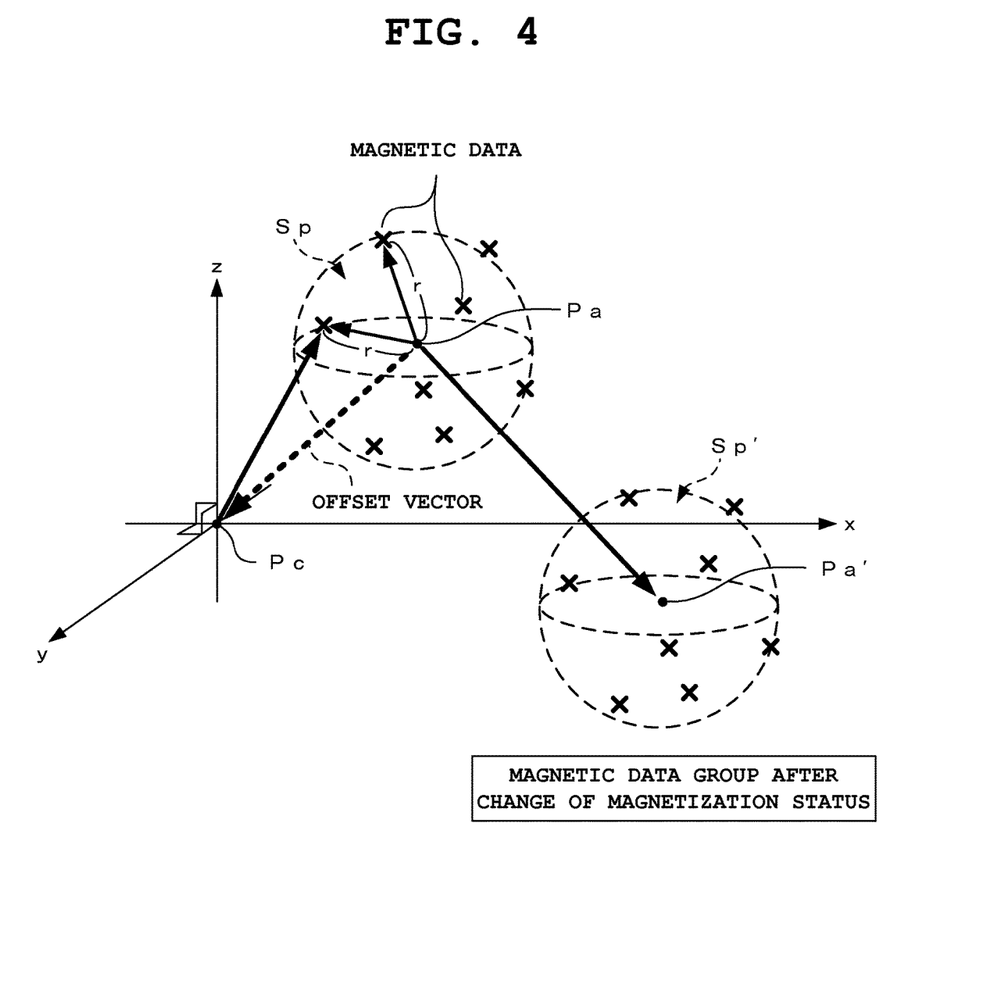
FIG. 4 is a conceptual diagram of a relation between an example of magnetic sensor output distribution and offset correction.

FIG. 4 is a conceptual diagram of a relation between an example of magnetic sensor output distribution and offset correction.

Figure 5:
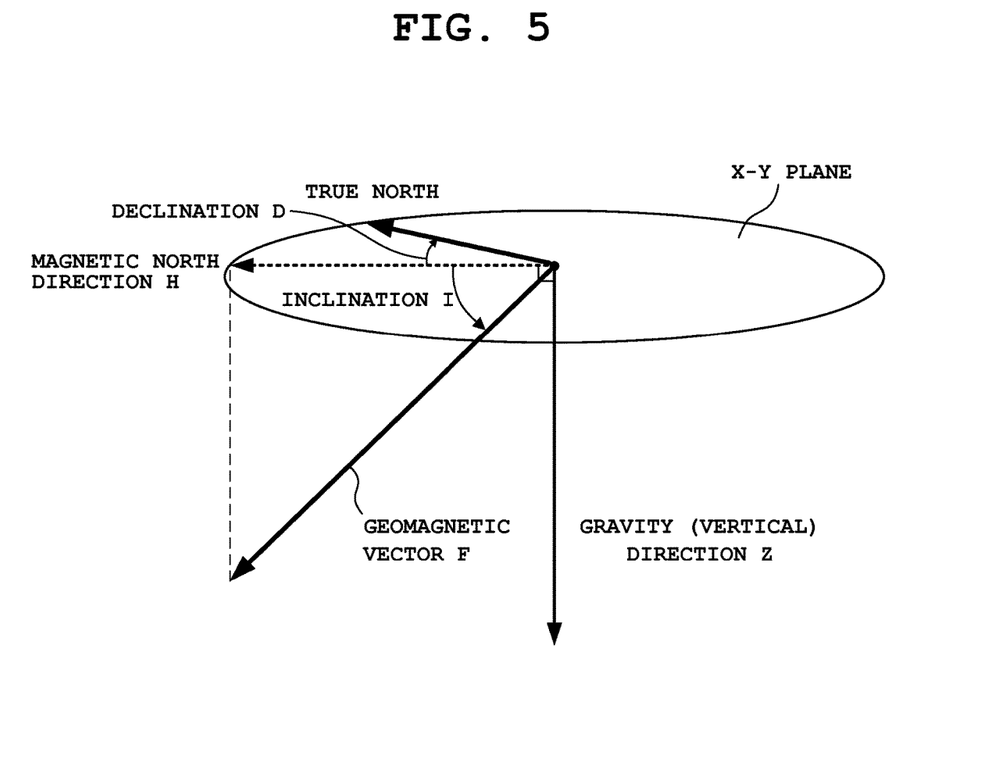
FIG. 5 is a conceptual diagram of a relation between a geomagnetic vector and a magnetic north direction (a magnetic pole direction)

FIG. 5 is a conceptual diagram of a relation between a geomagnetic vector and a magnetic north direction (a magnetic pole direction).

Figure 6:
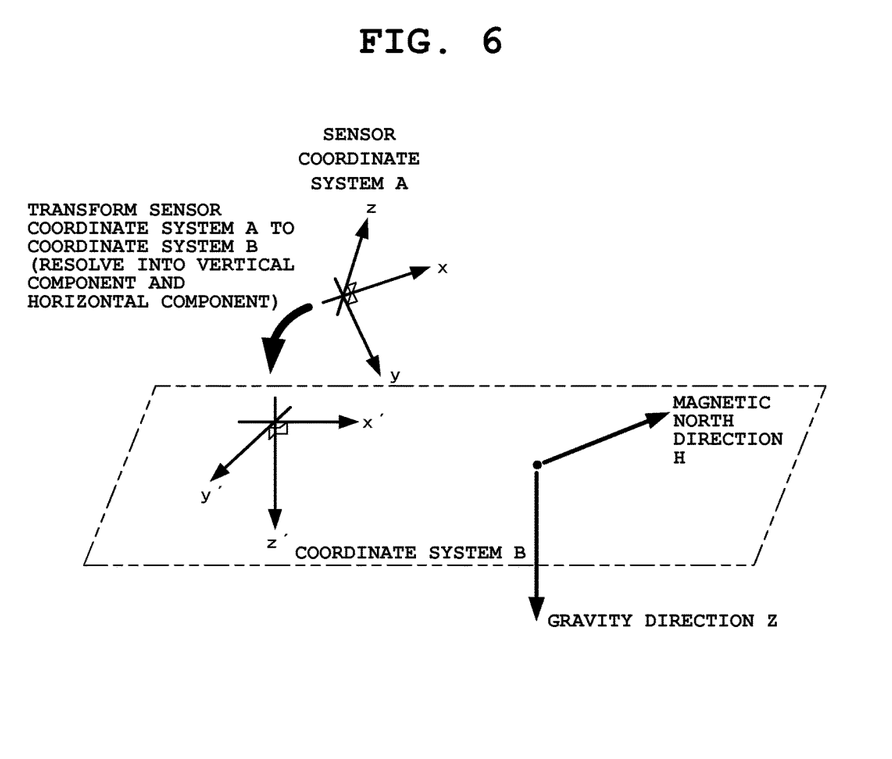
FIG. 6 is a conceptual diagram of coordinate transformation processing according to the embodiment.

FIG. 6 is a conceptual diagram of coordinate transformation processing according to the present embodiment.

Figure 7:
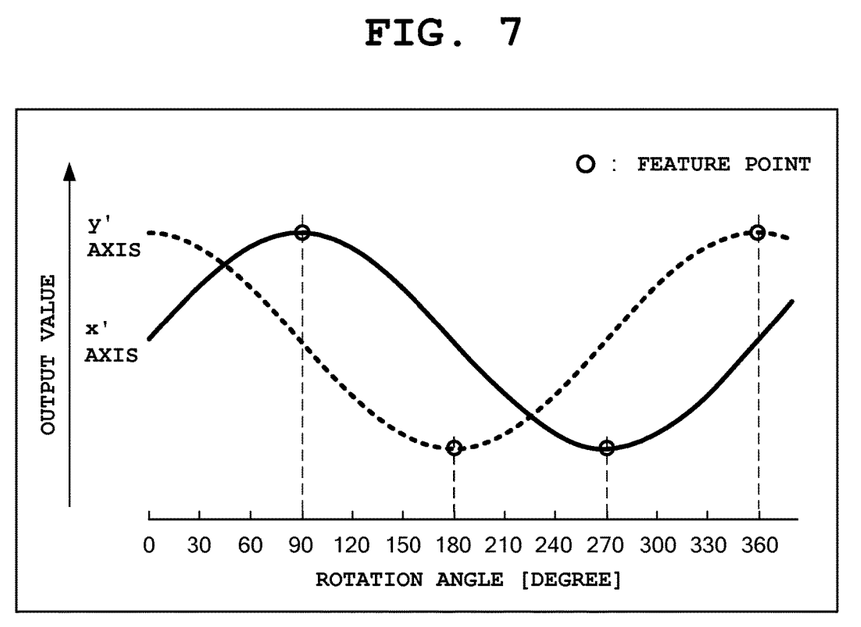
FIG. 7 is a waveform diagram of an example of output waveforms of a magnetic sensor on an x' axis and a y' axis after coordinate transformation according to the embodiment.

FIG. 7 is a diagram showing an example of the output waveforms of a magnetic sensor on an x' axis and a y' axis after coordinate transformation according to the present embodiment.

Figure 8:
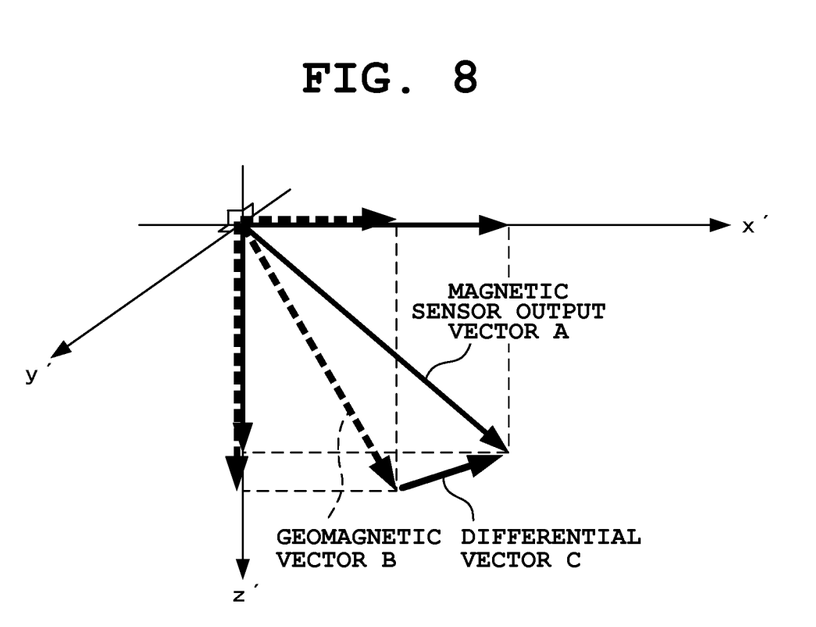
FIG. 8 is a conceptual diagram of a relation between a magnetic sensor output vector and a geomagnetic vector.

FIG. 8 is a conceptual diagram of a relation between a magnetic sensor output vector and a geomagnetic vector.

In the method for controlling the electronic device 100 according to the present embodiment, in the electronic device 100 including the magnetic sensor 110, the motion sensor 120, the GPS receiving circuit 130, and the communication function section 140, a series of processing such as those depicted in the flowchart of FIG. 3 is performed.

First, by the input operating section 150 being operated by a user, driving power is supplied from the power supply section 190 to each section inside the electronic device 100 to start the electronic device 100.

As a result, the arithmetic circuit section 170 performs normal processing including at least a sensing operation by the magnetic sensor 110 and the motion sensor 120 and a positioning operation by the GPS receiving circuit 130 (Step S102).

In the normal operation, when the electronic device 100 including the triaxial magnetic sensor 110 is rotated or moved under predetermined geomagnetism, and magnetic data acquired by the magnetic sensor 110 is plotted on three-dimensional coordinates in three axes, the data is substantially distributed on a spherical plane Sp, as depicted in FIG. 4.

Here, a center point Pa of a sphere formed by this spherical plane Sp indicates a reference point of a magnetic data group acquired by the magnetic sensor 110, and a radius r of the sphere corresponds to the strength of geomagnetism.

The center point Pa of the sphere coincides with an origin Pc of the magnetic data group in three axes (x axis, y axis, and z axis) depicted in FIG. 4 if the magnetic sensor 110 is not in a state of being magnetized by magnetism by an electronic component inside the electronic device, ambient magnetic field, and the like. On the other hand, if the magnetic sensor 110 is in a state of being magnetized by receiving an effect of magnetism by an electronic component inside the electronic device, ambient magnetic field, and the like, the center point Pa of the sphere is at a position shifted from the origin Pc by an offset due to magnetization, as depicted in FIG. 4.

Therefore, an offset value corresponding to a difference between the center point Pa of the sphere and the true origin Pc (referred to as "offset vector" in FIG. 4) is calculated. Then, offset correction is performed by this offset value being subtracted from the magnetic data group acquired by the magnetic sensor 110, whereby the effect of the ambient magnetic field of the magnetic sensor 110 is removed and an accurate azimuth with reference to the electronic device 100 is calculated.

Next, for example, when the ambient environment of the electronic device 100 is changed and the ambient magnetic field of the electronic device 100 is changed thereby, the magnetization state of the magnetic sensor 110 is also changed by receiving of the effect of the change of the magnetic field. Here, magnetic data to be acquired by the magnetic sensor 110 is changed by receiving the effect of the change of the magnetization state.

Accordingly, the distribution of a magnetic data group to be acquired by the magnetic sensor 110 in a changed magnetization state (referred to as "magnetic data group after change of magnetization state" in FIG. 4) is changed (moved) from a position on the three-dimensional coordinates of the distribution of the magnetic data distribution (the spherical plane Sp and the center position Pa of the sphere) for which an offset value has been calculated immediately previously (a spherical plane Sp' and a center point Pa' of its sphere in FIG. 4).

In this case, if offset correction of subtracting the above-mentioned offset value from the magnetic data group after the change of the magnetization state is performed, the calculated azimuth is different from the accurate azimuth.

That is, in the magnetic data group after the change of the magnetization state, the offset value has been changed from the state before the effect of the change of the magnetic field around the electronic device 100. Therefore, it is required to calculate an offset value in the magnetic data group after the change of the magnetization state and make offset correction with this offset value.

Therefore, the arithmetic circuit section 170 repeatedly monitors a change of the offset value (offset anomaly) at predetermined intervals so as to judge whether a state in which calibration processing is required to be performed has occurred (Step S104).

Specifically, the arithmetic circuit section 170 judges whether the distribution of the magnetic data group after offset correction is on the spherical plane centering on the origin Pc in the three-dimensional coordinates or within an allowable range from the spherical plane when offset correction is performed using the previously-calculated offset value on the magnetic data group acquired by the magnetic sensor 110. When the distribution of the magnetic data group after the offset correction is far from the allowable range from the spherical plane centering on the origin Pc in the three-dimensional coordinates, the arithmetic circuit section 170 judges that a state (offset anomaly) has occurred in which the current offset value has been significantly changed from the allowable range with respect to the offset value acquired from the immediately previous calibration processing, and that a state where calibration processing is necessary has occurred (YES at Step S104), and starts calibration processing (Step S106).

On the other hand, when the distribution of the magnetic data group after the offset correction is on the spherical plane centering on the origin Pc in the three-dimensional coordinates or within the allowable range from the spherical plane, the arithmetic circuit section 170 judges that a state (offset anomaly) has not occurred in which the current offset value has been significantly changed from the allowable range with respect to the offset value acquired from the immediately previous calibration processing, and that calibration processing is not required (NO at Step S104), and returns to Step S102 to continue the normal processing.

Alternatively, when a distance between magnetic data acquired for a predetermined period and the center point Pa (the radius r of the sphere, that is, the magnitude of geomagnetism) or a distance between the magnetic data group after the offset correction and the origin Pc has been changed by an amount larger than a predetermined amount, the arithmetic circuit section 170 judges that a change in the offset value (offset anomaly) has occurred, and starts calibration processing (Step S106).

On the other hand, when the distance between the magnetic data and the center point Pa or the distance between the magnetic data group after the offset correction and the origin Pc has not been changed by an amount larger than the predetermined amount, the arithmetic circuit section 170 judges that a change in the offset value (offset anomaly) has not occurred (NO at Step S104), and returns to Step S102 to continue the normal processing.

Note that the processing for judging whether an offset anomaly has occurred at Step S104 should preferably be performed in the background during the normal operation at Step S102.

Also, the processing for judging whether an offset anomaly has occurred is not limited to the above-described method.

For example, the arithmetic circuit section 170 may compare the magnitude (strength) of geomagnetism observed in advance for the geographical position of a point derived based on positioning data acquired by the GPS receiving circuit 130 and the magnitude of a magnetic sensor output vector calculated based on magnetic data acquired by the magnetic sensor 110 and, when a difference therebetween is equal to or larger than a predetermined threshold, may judge that an offset anomaly has occurred.

In the calibration processing applied in the present embodiment, the arithmetic circuit section 170 first calculates a coordinate transformation parameter Rg for transforming a sensor coordinate system to a gravity-direction-based coordinate system, based on acceleration data acquired by the acceleration sensor 122 provided in the motion sensor 120 (Step S108).

Next, the arithmetic circuit section 170 subjects the magnetic data acquired by the magnetic sensor 110 to coordinate transformation processing defined by the coordinate transformation parameter Rg to resolve a magnetic sensor output vector into a vertical component and a horizontal component (Step S110).

Specifically, in the three-dimensional coordinates where the gravity direction is a vertical direction and a plane vertical thereto is a horizontal plane (X-Y plane), a geomagnetic vector F is generally tilted with a predetermined inclination I for each point with respect to the horizontal plane, as depicted in FIG. 5.

By projecting this geomagnetic vector F onto the horizontal plane, a horizontal component of the geomagnetic vector F is found.

This horizontal component corresponds to a magnetic north direction H (a magnetic pole direction) and, by rotation in consideration of a declination D for each point, a true north direction is found.

Here, when the magnetic sensor output vector calculated based on the magnetic data acquired by the magnetic sensor 110 in the magnetized state is projected onto the horizontal plane as in the above case, its horizontal component is directed to a direction shifted from the magnetic north direction H.

In the present embodiment, the following processing is performed to calculate a horizontal component of the magnetic sensor output vector.

The arithmetic circuit section 170 first calculates the coordinate transformation parameter Rg for defining coordinate transformation processing for transforming a vector (gx, gy, gz) of the output component of the acceleration data acquired in a coordinate system (sensor coordinate system A formed of x, y and z axes) of the acceleration sensor 122 to coordinate system B formed of x', y', and z' axes as a vector (0, 0, −|G|) based on the gravity direction Z, as depicted in FIG. 6.

Here, sensor coordinate system A represents coordinates moving together with the motion of the motion sensor 120 mounted in the electronic device 100.

|G| corresponds to the magnitude of the vector (gx, gy, gz) of the output component of the acceleration data acquired by the acceleration sensor 122.

The gravity direction Z of coordinate system B is derived by, for example, calculating an average of acceleration data collected by the acceleration sensor 122 for a predetermined period as a vector.

Note that a known method such as an affine transformation formula can be applied in the above-described coordinate transformation processing.

Next, the arithmetic circuit section 170 subjects the magnetic data acquired by the magnetic sensor 110 to coordinate transformation processing based on the calculated coordinate transformation parameter Rg.

As a result, the magnetic sensor output vector is resolved into a vertical component (component in the gravity direction Z) and a horizontal direction (component in the X-Y plane).

Here, by the above-described coordinate transformation processing, the gravity direction Z corresponds to the z' axis direction of coordinate system B, and the X-Y plane corresponds to the x'-y' axis plane of coordinate system B.

Next the arithmetic circuit section 170 starts feature point detection processing for detecting a feature point where a horizontal component on the x' axis or the y' axis has a maximum value or a minimum value, for the magnetic sensor output resolved into the vertical component in the gravity direction Z and the horizontal component in the X-Y plane (Step S112).

Specifically, for the magnetic sensor output resolved into the vertical component and the horizontal component at Step S110, the values of the horizontal components of the magnetic sensor output on the x' axis and the y' axis when the x' axis and the y' axis are rotated (360 degrees) around the gravity axis (the z' axis of the coordinate system B) in a plane vertical to the gravity axis are changed with respect to the rotation angle, as depicted in FIG. 7.

Here, as a method for rotating the magnetic sensor output around the gravity axis, for example, a method in which the user carrying the electronic device 100 including the magnetic sensor 110 rotates at 360 degrees at the same position in parallel to the ground surface, a method in which the user carrying the electronic device 100 moves around a running track, a method in which the user places the electronic device 100 on a desk and horizontally rotates the electronic device 100, or the like can be adopted.

Note that the operation of rotating the magnetic sensor output around the gravity axis is to detect a feature point included in the horizontal component of the magnetic sensor output, as will be described further below. Therefore, the magnetic sensor 110 is not necessarily required to be rotated (360 degrees) as long as a change in the rotation angle occurs in a range including at least one feature point depicted in FIG. 7.

Therefore, for example, a change in the rotation angle in a range including a feature point can be favorably generated by the user carrying the electronic device 100 and performing a daily motion, an arbitrary exercise, or the like without particular awareness.

That is, by the processing in the background, a change of the horizontal components of the magnetic sensor output on the x' axis and the y' axis in accordance with the rotation angle can be acquired.

In the change of the horizontal components of the magnetic sensor output on the x' axis and the y' axis depicted in FIG. 7, when the x' axis is oriented to the magnetic north direction H (for example, the x' axis is at 90 degrees), the component on the x' axis has a maximum value. When the x' axis is oriented to a direction opposite to the magnetic north direction H (for example, the x' axis is at 270 degrees), the component on the x' axis has a minimum value. Similarly, when the y' axis is oriented to the magnetic north direction H (for example, the y' axis is at 360 degrees), the component on the y' axis has a maximum value. When the y' axis is oriented to the direction opposite to the magnetic north direction H (for example, the y' axis is at 180 degrees), the component on the y' axis has a minimum value.

Here, since a phase difference between the x' axis and the y' axis is 90 degrees, the component on the y' axis monotonously decreases near a rotation angle where the component on the x' axis has a maximum value. The component on the y' axis monotonously increases near a rotation angle where the component on the x' axis has a minimum value.

In the present embodiment, a point where a component on the x' axis or the y' axis has a maximum or minimum value (represented as a circle in the drawing) is defined as a feature point. This feature point is detected (Step S114) in the feature point detection processing.

The rotation angle at the feature point detected by the feature point detection processing corresponds to the magnetic north direction H or a magnetic south direction opposite thereto (a magnetic pole direction).

That is, in the magnetized state, the magnetic sensor 110 receives an effect of a magnetic field due to the magnetized state different from geomagnetism that is an original measurement target, as described above. Therefore, an azimuth calculated based on acquired magnetic data is different from the accurate azimuth.

However, since the effect of the magnetic field is due to the magnetized state of the magnetic sensor 110 itself, it is not changed even if the direction of the magnetic sensor 110 is changed.

On the other hand, the direction of geomagnetism (the magnetic north direction H or the magnetic south direction opposite thereto) is constant irrespective of the direction of the magnetic sensor 110 unless the geographic position on the earth is changed.

Therefore, irrespective of whether the magnetic sensor 110 is in a magnetized state, a feature point of the horizontal component of the magnetic sensor output on the x' axis or the y' axis can be detected. As a result, it is possible to judge whether the x' axis or the y' axis of the magnetic sensor 110 is oriented to the magnetic north direction H (or the magnetic south direction opposite thereto).

Thus, in the present embodiment, it is possible to calculate an offset value for a magnetic sensor output and calculate an accurate azimuth by a method described further below.

When no feature point is detected in the components on the x' axis and the y' axis depicted in FIG. 7 at Step S114 (NO at Step S114), the arithmetic circuit section 170 returns to Step S110 to continue the coordinate transformation processing on the magnetic data and the output component resolution processing on the output component.

On the other hand, when a feature point is detected in the component on the x' axis or the y' axis (YES at Step S114), the arithmetic circuit section 170 first acquires the inclination, the vertical component, and the horizontal component of a geomagnetic vector at that point based on the current position of the electronic device 100 (Step S116).

Specifically, the arithmetic circuit section 170 acquires the inclination, the vertical component, and the horizontal component of the geomagnetic vector at that point from positioning data acquired by the GPS receiving circuit 130 and latitude and longitude data included in position information acquired by the communication function section 140 from the access point of the wireless LAN or the like.

As a result, geomagnetic vector B at that point is found on coordinate system B, as depicted in FIG. 8.

Here, as a method for finding geomagnetic vector B based on the position information (latitude and longitude data), for example, a calculation formula published by Geospatial Information Authority of Japan can be adopted, in which the magnetic distribution near Japan is approximated by a quadratic expression with the latitude and longitude.

Note that the method for finding geomagnetic vector B based on the position information is not limited to the method of applying a predetermined calculation formula such as that described above.

For example, a reference table in which position information (latitude and longitude data) and the inclination, the vertical component, the horizontal component, and the like of the geomagnetic vector have been associated with each other may be prepared in advance, and the inclination, the vertical component, the horizontal component of the geomagnetic vector at that point may be extracted with reference to the reference table based on position information acquired by the GPS receiving circuit 130 or the communication function section 140 having a wireless LAN function or the like, so that geomagnetic vector B is found on coordinate system B.

In this case, the reference table may be stored in advance in the memory section 180 or may be stored in a server or the like on a network connectable via the communication function section 140.

The position information acquired by the communication function section 140 from an access point of the wireless LAN is preferably applied as complementary information or information that is used in combination when positioning data cannot be acquired by the GPS receiving circuit 130 or when positioning accuracy is low, because the number of installed access points and their installation positions vary.

At Step S114, the arithmetic circuit section 170 finds, as magnetic sensor output vector A on coordinate system B, a vector of the output component when a feature point of the horizontal component of the magnetic sensor output is detected, as depicted in FIG. 8.

Then, based on a difference between magnetic sensor output vector A when the feature point is detected and geomagnetic vector B at that point based on the position information, the arithmetic circuit section 170 calculates an offset value occurring in the magnetic data acquired by the magnetic sensor 110 in the magnetized state.

Then, the arithmetic circuit section 170 causes the calculated offset value to be stored in a predetermined storage area of the memory section 180, and thereby updates the offset value (Step S118).

That is, when the magnetic sensor 110 has been corrected based on the correct offset value, magnetic sensor output vector A based on the magnetic data acquired by the magnetic sensor 110 and geomagnetic vector B based on the position information at that point coincide with each other.

However, as described above, when the magnetic sensor is in a magnetized state and offset correction has not been correctly performed, the magnetic data acquired by the magnetic sensor 110 is outputted with original geomagnetism being synthesized with an offset component caused by an effect of the magnetic field occurring due to the magnetized state. As a result, magnetic sensor output vector A and geomagnetic vector B are different vectors as depicted in FIG. 8.

In the present embodiment, a vector (differential vector C) representing a difference between magnetic sensor output vector A and geomagnetic vector B is found by the arithmetic circuit section 170.

This differential vector C represents a new offset value (offset vector) due to the magnetized state of the magnetic sensor 110 in the magnetized state.

Next, by correcting the magnetic data (data group distributed on the spherical plane Sp' of the center point Pa' depicted in FIG. 4) acquired by the magnetic sensor 110 by using the updated offset value (differential vector C) stored in the memory section 180, the arithmetic circuit section 170 calculates an azimuth with reference to the electronic device 100 (Step S120).

Note that the arithmetic circuit section 170 may thereafter return to the normal processing at Step S102 to perform azimuth calculation processing as normal processing.

Although omitted in the flowchart of FIG. 3, the arithmetic circuit section 170 always monitors for an input operation for interrupting or ending the processing operation and a change in the operation status during the execution of the above-described series of processing operations and, when an input operation or a status change is detected, forcibly ends the processing operation.

Specifically, the arithmetic circuit section 170 detects an operation of disconnecting an operation power supply by the user, a reduction of the remaining battery amount of the power supply section 190, an anomaly in a function or an application being executed, and the like, and forcibly interrupts and ends the series of processing operations.

In the series of processing operations described above, the arithmetic circuit section 170 performs calibration processing at Step S106 and the following steps when an offset anomaly is detected at Step S104. However, the present invention is not limited thereto.

For example, a configuration may be adopted in which, when it is detected that the user carrying the electronic device turns a corner or the like to change a moving direction, calibration processing at the above-described Step S106 and the following steps is performed to detect a feature point and, when a feature point is detected, an offset value is calculated.

The series of processing operations described above should preferably be performed automatically in the background in a daily use state of the electronic device 100 without particular awareness of the user. However, the user may be prompted to perform specific processing or operation as appropriate during the series of processing operations.

Specifically, for example, a configuration may be adopted in which a request to perform an operation of rotating the magnetic sensor 110 (electronic device 100) around the gravity axis at Step S112 is given via the display section 162, the acoustic section 164, or the like provided in the output section 160 so that the user performs this operation.

As described above, in the present embodiment, for magnetic data (magnetic sensor output) acquired by the magnetic sensor, processing is performed in which a sensor coordinate system is transformed to a gravity-direction-based coordinate system based on acceleration data acquired by the acceleration sensor, whereby the magnetic sensor output is resolved into a vertical component and a horizontal component.

Then, a feature point for defining a magnetic north direction for the horizontal component of the magnetic sensor output is detected, a magnetic sensor output vector and a geomagnetic vector when the feature point is detected are compared with each other, and the differential vector is calculated as an offset value of the magnetic sensor.

Then, the magnetic data acquired by the magnetic sensor is corrected by using the calculated offset value, whereby an azimuth with the electronic device as a reference is calculated.

In the electronic device according to the present embodiment, the series of processing operations including judgment processing when calibration processing is performed and an operation for detecting a feature point of an output component can be performed with awareness of the user or can be performed in the background without particular awareness of the user.

Therefore, in the present embodiment, it is possible to automatically perform calibration processing (offset correction) on the magnetic sensor and calculate an accurate azimuth even if the user does not perform a specific motion or an operation with awareness.

Also, in the electronic device according to the present embodiment, an operation of rotating a magnetic sensor output around the gravity axis is performed in order to detect a feature point of the output component. This operation is performed with the user carrying or wearing the electronic device or the electronic device being put on a desk. Therefore, the orientation of the electronic device is hardly changed.

On the other hand, in the offset information acquiring method disclosed in Japanese Patent No. 4391416 described above, if the orientation of the electronic device is not changed, solutions by statistical methods are not computable, or a calculation error is too large and an erroneous solution is computed. Therefore, an offset value cannot be calculated.

However, in the present embodiment, even if the orientation of the electronic device is not changed, a feature point of an output component acquired from the above-described operation is detected, and an offset value of the magnetic sensor in a magnetized state is calculated, whereby calibration processing is favorably performed.

In the above-described embodiment, the magnetic sensor, the acceleration sensor, and the position acquiring section such as the GPS receiving circuit are provided and calibration processing is performed based on magnetic data acquired with the orientation of the electronic device being unchanged. However, the present invention is not limited thereto.

That is, a configuration may be adopted in which the rotation angle of each of the x, y, and z axes of sensor coordinate system A is detected by the angular velocity sensor 124 provided in the motion sensor 120, and the above-described feature point is detected by coordinate transformation processing being performed on initial coordinate system B immediately after the start of calibration processing based on or in combination with the rotation angle. As a result, calibration processing according to the present embodiment can be favorably performed not only when the orientation of the electronic device is not changed but also when the orientation is changed.

While the present invention has been described with reference to the preferred embodiments, it is intended that the invention be not limited by any of the details of the description therein but includes all the embodiments which fall within the scope of the appended claims.

What is claimed is:

1. An electronic device comprising:
    a magnetic sensor which detects a magnetic field around the electronic device and outputs magnetic data in accordance with the magnetic field detected by the magnetic sensor;
    a position acquiring circuit which acquires position information regarding a geographic position of the electronic device; and
    a processor which is configured to:
    (i) detect whether an output vector of the magnetic data output by the magnetic sensor is oriented to a magnetic pole direction of the earth;
    (ii) when it is detected that the output vector of the magnetic data is oriented to the magnetic pole direction of the earth, acquire, from the position acquiring circuit, specific position information for a specific position at which the electronic device is located when it is detected that the output vector of the magnetic data is oriented to the magnetic pole direction of the earth,
    (iii) acquire a geomagnetic vector at the specific position based on the specific position information,
    (iv) calculate an the offset value of the magnetic sensor based on a comparison between the geomagnetic vector and the output vector, (v) correct the magnetic data output by the magnetic sensor based on the calculated offset value, (vi) calculate an azimuth to which the electronic device is oriented, based on the corrected magnetic data, and (vii) control an output section to output information about the calculated azimuth to a user.

2. The electronic device according to claim 1, wherein the processor calculates a differential vector between the geomagnetic vector and the output vector, and acquires the differential vector as the offset value.

3. The electronic device according to claim 1, further comprising:

an acceleration sensor which detects acceleration and outputs acceleration data corresponding to the detected acceleration, wherein the processor performs, on three-dimensional coordinates having one axis set in a gravity direction and two axes set in a horizontal direction orthogonal to the gravity direction, coordinate transformation processing for resolving the magnetic data outputted from the magnetic sensor into a vertical component in the gravity direction and a horizontal component in the horizontal direction based on the acceleration data.

4. The electronic device according to claim 1, wherein the processor detects whether the output vector is oriented to the magnetic pole direction based on a change of a component in a horizontal direction in the magnetic data outputted from the magnetic sensor when a direction of the magnetic sensor is changed on three-dimensional coordinates having one axis set in a gravity direction and two axes set in the horizontal direction orthogonal to the gravity direction.

5. The electronic device according to claim 4, wherein the processor:

(i) takes, as a feature point, a point where a value of the component in the horizontal direction in the magnetic data indicates a maximum value or a minimum value when the magnetic sensor is rotated around the axis in the gravity direction, and (ii) judges that the output vector is oriented to the magnetic pole direction when the feature point is detected in the component in the horizontal direction in the magnetic data.

6. The electronic device according to claim 1, wherein the processor has a function for performing calibration processing for correcting the magnetic data based on the offset value, and wherein the processor:

(i) monitors, whenever acquiring the offset value after performing the calibration processing with the offset value having a first value, whether the acquired offset value has been changed more than a predetermined allowable range with respect to the first value, and (ii) corrects, when the offset value is detected by the monitoring to have a second value larger than the allowable range with respect to the first value, the magnetic data by the calibration processing based on the offset value having the second value.

7. The electronic device according to claim 1, wherein the position acquiring section circuit acquires the position information based on information received from a GPS satellite.

8. The electronic device according to claim 1, wherein the position acquiring circuit has a communication function section which performs external wireless communication, and acquires the position information based on wireless communication with an access point or a communication base station in the external wireless communication.

9. The electronic device according to claim 1, wherein the specific position information includes values of a latitude and a longitude of the specific position, and wherein the processor calculates an inclination, a vertical component, and a horizontal component of the geomagnetic vector based on the values of the latitude and the longitude included in the specific position by using a predetermined calculation formula.

10. The electronic device according to claim 1, wherein the specific position information includes values of a latitude and a longitude of the specific position, and wherein the processor derives an inclination, a vertical component, and a horizontal component of the geomagnetic vector based on the values of the latitude and the longitude included in the specific position by referring to a reference table prepared in advance.

11. A method for an electronic device comprising a magnetic sensor which detects a magnetic field around the electronic device and outputs magnetic data in accordance with the magnetic field detected by the magnetic sensor and a position acquiring circuit which acquires position information regarding a geographic position of the electronic device, the method comprising:

detecting whether an output vector of the magnetic data output by the magnetic sensor is oriented to a magnetic pole direction of the earth;

when it is detected that the output vector of the magnetic data is oriented to the magnetic pole direction of the earth, acquiring, from the position acquiring circuit, specific position information for a specific position at which the electronic device is located when it is detected that the output vector is oriented to the magnetic pole direction;

deriving a geomagnetic vector at the specific position based on the specific position information;

calculating an offset value in the magnetic sensor based on a comparison between the geomagnetic vector and the output vector;

correcting the magnetic data output by the magnetic sensor based on the calculated offset value;

calculating an azimuth to which the electronic device is oriented, based on the corrected magnetic data; and controlling an output section to output information about the calculated azimuth to a user.

12. The method according to claim 11, wherein said detecting whether the output vector is oriented to the magnetic pole includes a step of performing, on three-dimensional coordinates having one axis set in a gravity direction and two axes set in a horizontal direction orthogonal to the gravity direction, coordinate transformation processing for resolving the magnetic data outputted from the magnetic sensor into a vertical component in the gravity direction and a horizontal component in the horizontal direction based on acceleration data outputted from an acceleration sensor mounted in the electronic device.

13. The method according to claim 11, wherein said detecting whether the output vector is oriented to the magnetic pole direction includes detecting whether the output vector is oriented to the magnetic pole based on a change of a component in a horizontal direction in the magnetic data outputted from the magnetic sensor when a direction of the magnetic sensor is changed on three-dimensional coordinates having one axis set in a gravity direction and two axes set in the horizontal direction orthogonal to the gravity direction.

14. The method according to claim 13, wherein said detecting whether the output vector is oriented to the magnetic pole includes taking, as a feature point, a point where a value of the component in the horizontal direction in the magnetic data indicates a maximum value or a minimum value when the magnetic sensor is rotated around the axis in the gravity direction, and judging that the output vector is oriented to the magnetic pole when the feature point is detected in the component in the horizontal direction in the magnetic data.

15. The method according to claim 11, further comprising:
performing calibration processing for correcting the magnetic data based on the offset value;
monitoring, whenever acquiring the offset value after performing the calibration processing with the offset value having a first value, whether the acquired offset value has been changed more than a predetermined allowable range with respect to the first value; and
correcting, when the offset value is detected by the monitoring to have a second value larger than the allowable range with respect to the first value, the magnetic data by the calibration processing based on the offset value having the second value.

16. The method according to claim 11, wherein said acquiring the specific position information includes acquiring the specific position information based on information received from a GPS satellite.

17. The method according to claim 11, wherein said acquiring the specific position information includes acquiring the position information based on wireless communication with an access point or a communication base station in external wireless communication.

18. The method according to claim 11,
wherein the specific position information includes values of a latitude and a longitude of the specific position, and
wherein said deriving the geomagnetic vector includes a step of calculating an inclination, a vertical component, and a horizontal component of the geomagnetic vector based on the values of the latitude and the longitude included in the specific position by using a predetermined calculation formula.

19. The method according to claim 11,
wherein the specific position information includes values of a latitude and a longitude of the specific position, and
wherein said deriving the geomagnetic vector includes deriving an inclination, a vertical component, and a horizontal component of the geomagnetic vector based on the values of the latitude and the longitude included in the specific position by referring to a reference table prepared in advance.

20. A non-transitory computer-readable storage medium having a program stored thereon that is executable by a computer of an electronic device which comprises a magnetic sensor which detects a magnetic field around the electronic device and outputs magnetic data in accordance with the magnetic field detected by the magnetic sensor, and a position acquiring circuit which acquires position information regarding a geographic position of the electronic device, the program being executable by the computer cause the computer to perform functions comprising:
detecting whether an output vector of the magnetic data output by the magnetic sensor is oriented to a magnetic pole direction of the earth;
when it is detected that the output vector of the magnetic data is oriented to the magnetic pole direction of the earth, acquiring, from the position acquiring circuit, specific position information for a specific position at which the electronic device is located when it is detected that the output vector is oriented to the magnetic pole direction;
deriving a geomagnetic vector at the specific position based on the specific position information;
calculating an offset value in the magnetic sensor based on a comparison between the geomagnetic vector and the output vector;
correcting the magnetic data output by the magnetic sensor based on the calculated offset value;
calculating an azimuth to which the electronic device is oriented, based on the corrected magnetic data; and
controlling an output section to output information about the calculated azimuth to a user.

* * * * *

UNITED STATES PATENT AND TRADEMARK OFFICE
CERTIFICATE OF CORRECTION

PATENT NO. : 10,041,795 B2
APPLICATION NO. : 14/852465
DATED : August 7, 2018
INVENTOR(S) : Tatsuya Sekitsuka Page 1 of 1

It is certified that error appears in the above-identified patent and that said Letters Patent is hereby corrected as shown below:

In the Claims

Column 14, Line 65, Claim 1, Line 22, after "an" delete "the".

Column 15, Line 60, Claim 7, Line 2, after "acquiring" delete "section".

Column 16, Line 49, Claim 12, Line 3, after "includes" delete "a step of".

Column 17, Line 37 to 38, Claim 18, Lines 4 to 5, after "includes" delete "a step of".

Signed and Sealed this
Thirtieth Day of October, 2018

Andrei Iancu
*Director of the United States Patent and Trademark Office*